Dec. 30, 1969  E. W. HENDERSON ET AL  3,486,853

METHOD FOR PRODUCING CARBON BLACK

Filed Dec. 23, 1966

INVENTORS
E. W. HENDERSON
R. E. DOLLINGER

BY *Young and Quigg*

ATTORNEYS

United States Patent Office 3,486,853
Patented Dec. 30, 1969

3,486,853
METHOD FOR PRODUCING CARBON BLACK
Eulas W. Henderson, Borger, and Robert E. Dollinger, Phillips, Tex., assignors to Phillips Petroleum Company, a corporation of Delaware
Filed Dec. 23, 1966, Ser. No. 604,471
Int. Cl. C09c 1/50
U.S. Cl. 23—209.6
5 Claims

ABSTRACT OF THE DISCLOSURE

A process for producing carbon black by introducing a first free oxygen-containing gas stream axially into a reaction zone and at least one second free oxygen-containing gas stream through the circumferential periphery of the reaction zone downstream of the first stream and introducing a make-oil stream axially downstream of the introduction of the free oxygen-containing streams and controlling the property of the carbon black by adjusting the ratio between the amounts of the first and the second oxygen-containing gas streams.

---

This invention relates to a method and an apparatus for producing carbon black.

An important property of a carbon black is its surface area. For some applications, such as in tire carcass rubber, a low surface area is preferred. Low surface area carbon blacks are characterized by better mixing in rubber, faster extrusion of the rubber, and less heat build-up in the rubber. Thus, for some applications it would be desirable to be able to provide a furnace carbon black having a lower surface area than can normally be produced by a furnace process.

Another important property of a carbon black when used in the compounding of rubber for use in tire manufacturing is commonly referred to as "structure." There is a good correlation between the structure of a carbon black and the modulus of a rubber product compounded with said carbon black. Other properties being comparable, high structure carbon blacks normally yield high modulus rubber and low structure carbon blacks normally yield low modulus rubber. By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains. While the classifications are all relative, the carbon blacks of commerce can be classified generally as "high structure," "normal structure," and "low structure."

Furnace carbon blacks having high structure characteristics have several advantages in the compounding of rubber. For example, they are "easy processing," i.e., are readily compounded into the rubber. Another advantage is that rubber compounded with high structure carbon blacks possesses superior extrusion properties. For many of the applications where high structure furnace blacks are preferred, it would be desirable to have carbon blacks of higher structure than can normally be produced by furnace processes.

Furnace carbon blacks having relatively low structure for blacks made by a furnace process have, in some instances, proved to be useful in applications formerly served by channel blacks, for example, in reinforcing natural rubber products and in specific applications, such as in non-squeal, soft-riding tires. These blacks are often designated "low structure" furnace blacks even though their structure values or oil absorption values fall in the range for blacks generally designated as "normal" structure or in the range between "normal" and "high" structure because their oil absorption values are lower than normal for blacks made by a furnace process. Thus, for several applications it is desirable to be able to provide furnace carbon blacks having a relatively low structure for a carbon black made by a furnace process.

Thus, it would be desirable to have a furnace carbon black process wherein the surface area of the carbon black product is lower than that normally produced from a given hydrocarbon feedstock and wherein the structure of the carbon black product can be controlled and/or varied to meet market demands. The present invention provides such a process. In the practice of this invention in accordance with one embodiment thereof, there is produced, from a given hydrocarbon feedstock, a furnace carbon black product characterized by a decreased or lower surface and an increased or higher structure, i.e., a surface area which is lower and a structure which is higher than what would normally be expected from a furnace carbon black produced from said feedstock. In accordance with another embodiment of the invention, there is produced, from a given feedstock, a carbon black product characterized by a decreased or lower surface area and a decreased or lower structure, i.e., a surface area which is lower and a structure which is lower than what would normally be expected from a furnace carbon black produced from said feedstock.

An object of this invention is to provide valuable carbon blacks and methods of making same. Another object of this invention is to provide a process for the production of furnace carbon blacks having a low surface area and wherein the structure of the carbon black product can be controlled. Another object of this invention is to provide a process for making a furnace carbon black, from a given hydrocarbon feedstock, having a lower surface area and having a higher structure than the carbon black which normally would be produced from said hydrocarbon feedstock. Another object of this invention is to provide a process for making a furnace carbon black, from a given hydrocarbon feedstock, having a lower surface area and having a lower structure than the carbon black which normally would be produced from said hydrocarbon feedstock. Another object of this invention is to provide a furnace carbon black process wherein the properties of the carbon black product can be regulated and controlled so as to satisfy prescribed and predetermined requirements. Another object of this invention is to provide an improved apparatus for the production of carbon black. Other aspects, objects, and advantages of the invention will be apparent to those skilled in the art in view of this disclosure.

Thus, according to the invention, there is provided a process for producing carbon black, which process comprises: introducing a first stream of a free oxygen-containing gas tangentially into the upstream end portion of a generally cylindrical first zone having a length greater than its diameter; introducing a stream of a hydrocarbon feedstock axially into said first zone at a point downstream from the point of introduction of said free oxygen-containing gas; partially burning a portion of said feedstock under carbon black-producing conditions to form a carbon black product having a reduced surface area which is less than the surface area of the carbon black normally produced from said feedstock; and recovering said carbon black product.

Further according to the invention, there are provided combinations of apparatus which can be employed in carrying out the method of the invention.

It will be noted that in the practice of the invention a stream of tangentially introduced free oxygen-containing gas is used. If desired, a stream of free oxygen-containing gas can be introduced axially into the furnace in addition to, or as a replacement for a portion of, the stream of free oxygen-containing gas which is introduced tangentially into said furnace. When an axially introduced stream of free oxygen-containing gas is so used, the carbon black product will have an increased structure. In the practice of the invention, the ratio of axially introduced free oxygen-containing gas to tangentially introduced free oxygen-containing gas can be within the range of from 0 to about 3. When a carbon black product of increased structure is desired, it is preferred that said ratio be within the range of from 0.25 to about 1.5.

It will also be noted that the hydrocarbon feedstock is introduced into the furnace at a point downstream from the locus of introduction of said tangentially introduced free oxygen-containing gas. Said feedstock can be introduced over a range of distances downstream from the locus of introduction of the tangentially introduced free oxygen-containing gas which is within the range of from 0.1, preferably 0.25, to 10 times the diameter of the furnace chamber into which said streams are introduced. When all of the free oxygen-containing gas is introduced tangentially, it is preferred that the point of introduction of the hydrocarbon feedstock be at a distance downstream from the locus of introduction of the tangentially introduced free oxygen-containing gas, which is at least 4.5 times the diameter of the furnace chamber into which said streams are introduced.

The tangentially introduced air or other free oxygen-containing gas is introduced at a linear velocity which is preferably considerably lower than the velocities employed in the prior art. Preferably, the linear velocity of the tangentially introduced air will not exceed 100 feet per second, more preferably 50 feet per second. Said velocity is the linear velocity of air stream calculated at the outlet of the inlet tunnel(s).

In the practice of the invention the actual magnitude of the decrease in surface area and the change (increase or decrease) in structure are not of the essence of the invention. However, as a guide in practicing the invention, the decrease in surface area from that normally obtained with a given feedstock will usually be at least 2 square meters per gram; and the increase or decrease in oil absorption value will usually be at least 0.05 cc. per gram.

Air is the most commonly preferred free oxygen-containing gas. However, other free oxygen-containing gases can also be used. Thus, the free oxygen-containing gas can be air enriched with oxygen, essentially pure oxygen, or mixtures of oxygen with other gases. For convenience, the invention will be further described herein in terms of using air as the free oxygen-containing gas. However, it is to be understood that the invention is not limited to the use of air.

Figure 1:
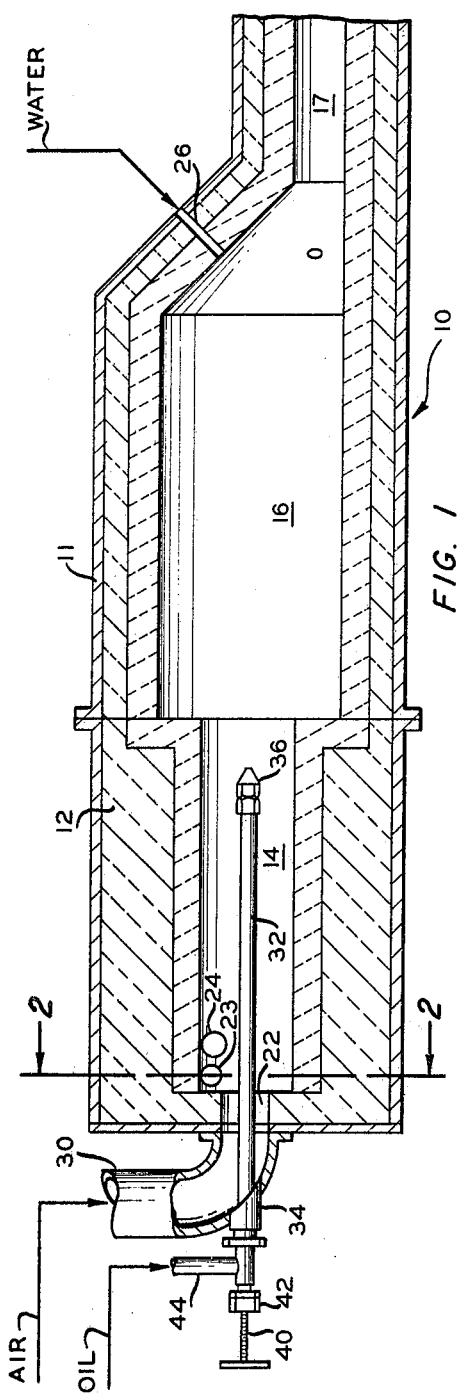
FIGURE 1 is a view partly in cross section, of one type of carbon black furnace which can be employed in the practice of the invention.
Figure 2:
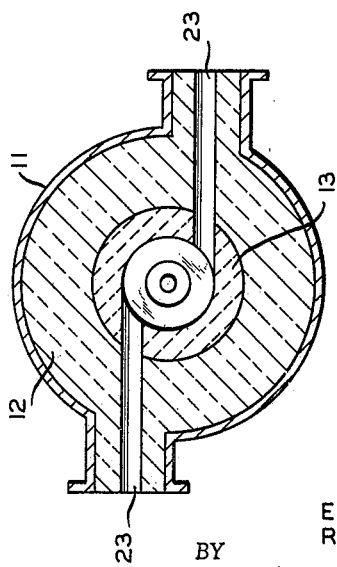
FIGURE 2 is a cross section taken along the lines 2—2 of FIGURE 1.

Referring now to the drawings, wherein like reference numerals are employed to denote like elements, the invention will be more fully explained. In FIGURES 1 and 2 the furnace designated generally by the reference numeral 10 in FIGURE 1 comprises a steel outer shell 11, an intermediate layer 12 of a suitable heat insulating material such as "Kaocast," and an inner lining 13 of a suitable refractory material such as "Carbofrax." "Kaocast" is a trademark for a 3000° F. kaolin base, refractory castable material. "Carbofrax" is a trademark for a high grade silicon carbide refractory, at least 85 weight percent silicon carbide. Other suitable refractory materials can be employed. Those skilled in the art will know of such other materials.

Said furnace comprises a first generally cylindrical, horizontally disposed section defining a first chamber 14 having a length greater than its internal diameter. Connected to the downstream end of said first section is a second generally cylindrical, horizontally disposed section defining a second chamber 16 which also has a length greater than its internal diameter. The internal diameter of said second chamber 16 is greater than the internal diameter of said first chamber 14. Said second chamber 16 is in open communication with said first chamber 14 and is in axial alignment therewith. A third generally cylindrical, horizontally disposed section defining a third chamber 17 is connected to the downstream end of said second section and is in open communication with said second chamber 16. Said third chamber 17 also has a length greater than its diameter but its diameter is less than the diameter of said second chamber. Preferably, the bottom of said third chamber 17 is in horizontal alignment with the bottom of said second chamber 16.

Axially positioned in the upstream end wall of said first chamber 14 are means comprising opening 22 for introducing a make hydrocarbon along the axis of said first chamber. Said make hydrocarbon introduction means can comprise any suitable means for introducing either a stream of liquid hydrocarbon, a stream of vaporized hydrocarbon, a stream of normally gaseous hydrocarbon, or a mixture of said hydrocarbon streams.

A first pair of inlet conduits 23 disposed in the upstream end portion of chamber 14, one extending through the upper portion of the cylindrical wall of said first chamber 14 and the other extending through the lower portion of said cylindrical wall (see FIGURE 2), comprises means for introducing gases comprising a free oxygen-containing gas into said first chamber substantially tangential to the cylindrical wall thereof. A second pair of like disposed inlet conduits 24 further comprises said means for introducing a free oxygen-containing gas into said first chamber. It will be noted that said second pair of inlet conduits is disposed adjacent to and downstream from said first pair of inlet conduits, and each of said second conduits has a larger diameter than each of said first conduits. As an example only, said first inlet conduits can each have a diameter of about 5.5 inches and said second inlet conduits can each have a diameter of about 6.5 inches. Said two sets of inlet conduits of differing sizes are useful as an aid in controlling the velocity of the tangentially introduced free oxygen-containing gas.

One or more conduits 26 extends radially through the wall of said second chamber 16 and comprises means for introducing a reaction quenching liquid into said second chamber. Said quenching liquid is normally water supplied in liquid form but can be any other suitable liquid. Said inlet means 26 can comprise any suitable means known to the art, for example, such as that illustrated in U.S. Patent 3,009,784. Said quench liquid inlet means 26 can be disposed at any suitable position along the length of said second chamber 16, depending upon the type of make hydrocarbon being introduced into the furnace, the amount of said make hydrocarbon, and the desired properties of the carbon black product, as will be understood by those skilled in the art. If desired, said chamber 16 can be provided with a plurality of sets of quench liquid inlet means disposed at different positions along the length of said chamber 16. If desired, one or more quench liquid inlets can also be provided for introducing quench liquid into the interior of said third chamber 17.

Figure 3:
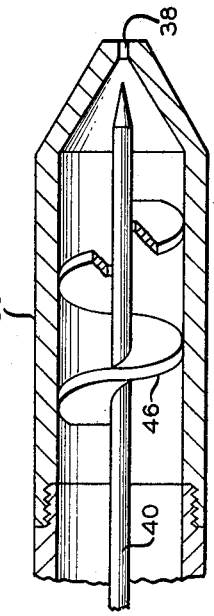
FIGURE 3 is a view, partly in cross section, illustrating a detail of the apparatus of FIGURE 1.

A bifluid introduction assembly is positioned in opening 22 in the upstream end of said furnace. Said assembly comprises a first conduit 30 having an inlet end and an outlet end. Said outlet end can be secured to the upstream end of said furnace and surrounding said opening 22 in any suitable manner. A second conduit 32 having an inlet end and an outlet end is positioned longitudinally within said first conduit 30 for at least a portion of its length. The outlet end of said second conduit 32 extends beyond the outlet end of said first conduit 30 and into first chamber 14 of furnace 10. The inlet end of said second conduit 32 extends through a wall of first conduit 30, as shown, and through a first packing gland 34 mounted on the wall of said first conduit. A nozzle body 36 is mounted on the outlet end of said second conduit 32. An opening 38 (see FIGURE 3) is provided in the downstream end of said nozzle body. A valve rod 40 is disposed within said nozzle body and said second conduit 32. The downstream end of said valve rod is adapted to coact with said opening 38 and vary the size thereof. The upstream end of said rod extends adjustably through a second packing gland 42 which is mounted on the inlet end of said second conduit 32. The threads on the upstream end of said rod 40 engage cooperating threads in said packing gland means 42 and provide means for adjustably moving said rod 40 toward and away from said opening 38. A third conduit 44 is attached to and communicates with the interior of second conduit 32 at a point between said first and said second packing glands for delivering hydrocarbon feedstock to the interior of second conduit 32 and valve body 36. If desired, the interior of valve body 36 can be provided with swirl vanes 46 to impart a swirl to the hydrocarbon feed exiting via opening 38.

It is not essential that the furnace used in the practice of the invention be provided with an enlarged chamber such as second chamber 16 downstream from first chamber 14. If desired, said first chamber 14 can be extended in length sufficient to provide the reactor volume provided by enlarged second chamber 16.

The following example will serve to further illustrate the invention. The Test Runs 2 to 7 set forth in the example were carried out in a reactor embodying the essential features of the reactor illustrated in FIGURES 1 and 2. In the reactor employed first chamber 14 was 24 inches in diameter and 12 feet in length. Second chamber 16 was 40 inches in diameter and 12 feet in length. Inlet tunnels 23 were approximately 5.5 inches in diameter and the center lines thereof were located approximately 4 inches downstream from the upstream end of first chamber 14. Inlet tunnels 24 were approximately 6.5 inches in diameter and the center lines thereof were located approximately 17 inches downstream from the upstream end of first chamber 14. Both sets of said inlet tunnels were employed in said Runs 2 to 7. The above dimensions are given by way of example only, are not limiting on the invention, and any and all can be varied in the practice of the invention. Typical properties of the charge oils used in these test runs are set forth below.

TABLE I

Properties of feedstock

| | |
|---|---|
| Gravity, ° API | 1.3 |
| ASTM distillation— | |
| ° F. @ 760 mm.: | |
| 2% (first drop) | 682 |
| 5 | 702 |
| 10 | 725 |
| 20 | 748 |
| 30 | 764 |
| 40 | 787 |
| 50 | 814 |
| 60 | 845 |
| 70 | 882 |
| 80 | 939 |
| 90 | 1030 |
| Bureau of Mines Correlation Index (BMCI) | 112 |
| Carbon wt. percent | 90.5 |
| Hydrogen do | 8.3 |
| Sulfur do | 0.75 |

EXAMPLE

A series of runs was made using as the hydrocarbon feedstock an aromatic concentrate oil of the type set forth in Table I above. Said feedstock was a conventional commercial feedstock obtained in commercial petroleum refining operations. Operating conditions, yields of carbon black, and tests on the carbon black products are set forth in Table II below. Another run, Run No. 1, was a control run. In this control run the furnace employed embodied the essential features of the upstream end of the furnace illustrated in FIGURE 1, i.e., first chamber 14, except that the hydrocarbon feedstock was introduced through a conventional bifluid assembly positioned in opening 22. Said conventional bifluid assembly was essentially like that illustrated in FIGURE 3 of Patent 2,616,795, except that the outlets of the hydrocarbon tube and the jacket air tube were within opening 22 and substantially even with the upstream wall of first chamber 14.

TABLE II

| | Run Number | | | | | | |
|---|---|---|---|---|---|---|---|
| | 1[a] | 2 | 3 | 4 | 5 | 6 | 7 |
| Oil Charge: | | | | | | | |
| Rate, gal./hour | 450 | 166 | 166 | 192 | 192 | 180 | 183 |
| Preheat, °F | 310 | 400 | 400 | 400 | 400 | 400 | 400 |
| Spray Pressure, p.s.i.g. | 90 | 120 | 110 | 195 | 270 | 185 | 135 |
| Oil spray position, ft.[b] | 0 | 9.3 | 8.3 | 8.3 | 0.3 | 8.3 | 8.3 |
| Furnace Conditions: | | | | | | | |
| Axial Air, M c.f.h | 4 | 0 | 0 | 28.9 | 28.9 | 28.9 | 28.9 |
| Tangential air rate, M c.f.h | 170 | 85 | 85 | 56.6 | 56.6 | 56.6 | 56.6 |
| Tangential air velocity, ft./sec.[c] | 205 | 25 | 25 | 17 | 17 | 17 | 17 |
| Total air/oil ratio, c.f./gal. | 408 | 512 | 512 | 445 | 445 | 475 | 467 |
| Ratio, axial air/tangential air | 0.02 | 0 | 0 | 0.51 | 0.51 | 0.51 | 0.51 |
| Carbon Black Product: | | | | | | | |
| Yield lb./gal. | 4.84 | 5.04 | 4.67 | 4.75 | | | 4.69 |
| Photelometer | 82 | 78 | 50 | 93 | 92 | 100 | 58 |
| N₂ Surface area, sq. m./g | 46 | 21 | 19 | 34 | 34 | 43 | 38 |
| Oil absorption, cc./g | 1.37 | 1.04 | 1.07 | 1.65 | 1.56 | 1.55 | 1.74 |

[a] Control run.
[b] Measured from the downstream side of air inlet port 24.
[c] Calculated at outlet of inlet tunnels.

Referring to Table II above and comparing control Run 1 with Runs 2 and 3, it will be noted that the air to oil ratio was increased from 408 cubic feet per gallon in Run 1 to 512 cubic feet per gallon in Runs 2 and 3. Normally, one would expect the surface area of the carbon black product to increase with this increase in air to oil ratio. Surprisingly, the surface area decreased from 46 square meters per gram in Run 1 to 21 and 19 square meters per gram, respectively, in Runs 2 and 3. It will also be noted that the oil absorption values decreased from 1.37 cc. per gram in Run No. 1 to 1.04 and 1.07 cc. per gram, respectively, in Runs 2 and 3, showing that the carbon black product in Runs 2 and 3 had a reduced structure as compared to that normally obtained from said feedstock.

Runs 4 and 5, when compared with Run 1, illustrate another embodiment of the invention. Said Runs 4 and 5 were carried out in a manner similar to Runs 2 and 3 except that a portion of the process air was introduced axially via conduit 30. Again, the surface area of the carbon black product decreased, i.e., from 46 to 34 square meters per gram, even though the air to oil ratio was increased from 408 to 445 cubic feet per gallon. Surprisingly, when a portion of the process air was introduced axially instead of tangentially the oil absorption value of the carbon black product increased from 1.37 cc. per gram to 1.65 and 1.56 cc. per gram, respectively, in Runs 4 and 5, showing that the carbon black product in Runs 4 and 5 had an increased structure as compared to that normally obtained from said feedstock.

Runs 6 and 7 also illustrate another feature of the invention. It will be noted that in Run 7 when the spray pressure was decreased from 185 to 135 p.s.i.g. the oil absorption value increased to 1.74 cc. per gram compared to 1.55 cc. per gram in Run No. 6. Thus, variation of the oil feedstock spray pressure in the process of this invention affords a method of controlling structure of the carbon black product.

The above-described aromatic concentrate oil used in the test runs of the example is typical of one presently preferred feedstock for use in the practice of the invention. However, conventional aromatic oils used in the production of furnace carbon blacks can include other types of aromatic concentrate oils. Typical properties of conventional aromatic oils are: boiling range, 400–1000° F.; BMCI, 75 to 150; and an API gravity of from about 0 to about 20°.

While the invention has been illustrated by the above examples employing a furnace having specific dimensions, the invention is not so limited. Said dimensions have been employed for illustrative purposes only and represent one presently preferred embodiment of the furnace of the invention. Any and all of said dimensions can be varied. The only requirements are that the length of first chamber 14 be greater than its internal diameter, e.g., said length being from 1.5 to 15 times said diameter; that the length of said second chamber be greater than its internal diameter and that the internal diameter of said second chamber be greater than the internal diameter of said first chamber, e.g., the length of said second chamber being from 1.2 to 10 times its internal diameter, and the internal diameter of said second chamber being from 1.1 to 2.4 times the internal diameter of said first chamber; and that the length of said third chamber also be greater than its internal diameter and that said diameter of said third chamber be less than the internal diameter of said first chamber, e.g., the length of said third chamber being from 2 to 8 times its internal diameter, and the internal diameter of said third chamber being from 0.4 to 0.9 times the internal diameter of said first chamber.

The invention is not to be limited to the use of aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane, or the like. Broadly, most any hydrocarbon can be used as feed in our process. However, the normally liquid hydrocarbons are preferred, and the normally liquid aromatic hydrocarbons are more preferred, because of the higher yields obtained therefrom. The feed can be injected as a liquid through a spray or atomizer, or the feed can be injected as a vapor. Hydrocarbons from other sources than petroleum likewise are suitable, as for example, low temperature coal gas, coal tar distillates, shale gases and distillates can be used. These feedstocks may contain most any class of hydrocarbon compound, as for example, saturated or unsaturated hydrocarbons, paraffins, olefins, aromatics, naphthenes, or any others which might become available.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for producing carbon black which comprises introducing a first stream of free oxygen-containing gas axially into a reaction zone, introducing a second free oxygen-containing gas into said reaction zone at at least one point through its circumferential periphery downstream of the introduction of said first free oxygen-containing gas stream, introducing a hydrocarbon feedstock axially into said zone downstream of the introduction of said second stream and partially burning a portion of said feedstock under carbon black producing conditions to form a carbon black product, the ratio of the quantity of axially introduced free oxygen-containing gas to the quantity of free oxygen-containing gas introduced through the circumferential periphery of the reaction zone being within the range of from 0.25 to about 3.

2. The process defined in claim 1 in which the feedstock is introduced into said zone at a distance of from 0.1 to 10 times the diameter of said zone downstream from the point of introduction of the stream introduced through the circumferential periphery of the reaction zone.

3. The process defined in claim 1 in which the introduction of the second stream of free oxygen-containing gas into the reaction zone is made at a linear velocity of less than 100 feet per second.

4. The process defined in claim 1 in which at least one of the free oxygen-containing gases is air.

5. The process defined in claim 1 in which the first and second streams comprise air, and the hydrocarbon feedstock comprises an aromatic concentrate oil, the total air to oil ratio established within said first zone being about 450 standard cubic feet per gallon.

References Cited

UNITED STATES PATENTS

| | | | |
|---|---|---|---|
| 3,410,660 | 11/1968 | Henderson et al. | 23—209.4 |
| 2,800,394 | 7/1957 | Peters | 23—209.4 |
| 2,917,370 | 12/1959 | Edminster et al. | 23—209.4 |
| 3,076,695 | 2/1963 | Claassen et al. | 23—209.4 |
| 3,079,236 | 2/1963 | Heller et al. | 23—209.4 |
| 3,256,066 | 6/1966 | Higgins | 23—259.5 |
| 3,307,911 | 3/1967 | Krejci | 23—209.4 |
| 3,342,556 | 9/1967 | Ruble | 23—209.4 |

EDWARD J. MEROS, Primary Examiner

U.S. Cl. X.R.

23—209.4, 259.5